Nov. 8, 1966 R. L. ROBERTSON 3,284,028
AIRCRAFT
Filed Dec. 7, 1964 2 Sheets-Sheet 1
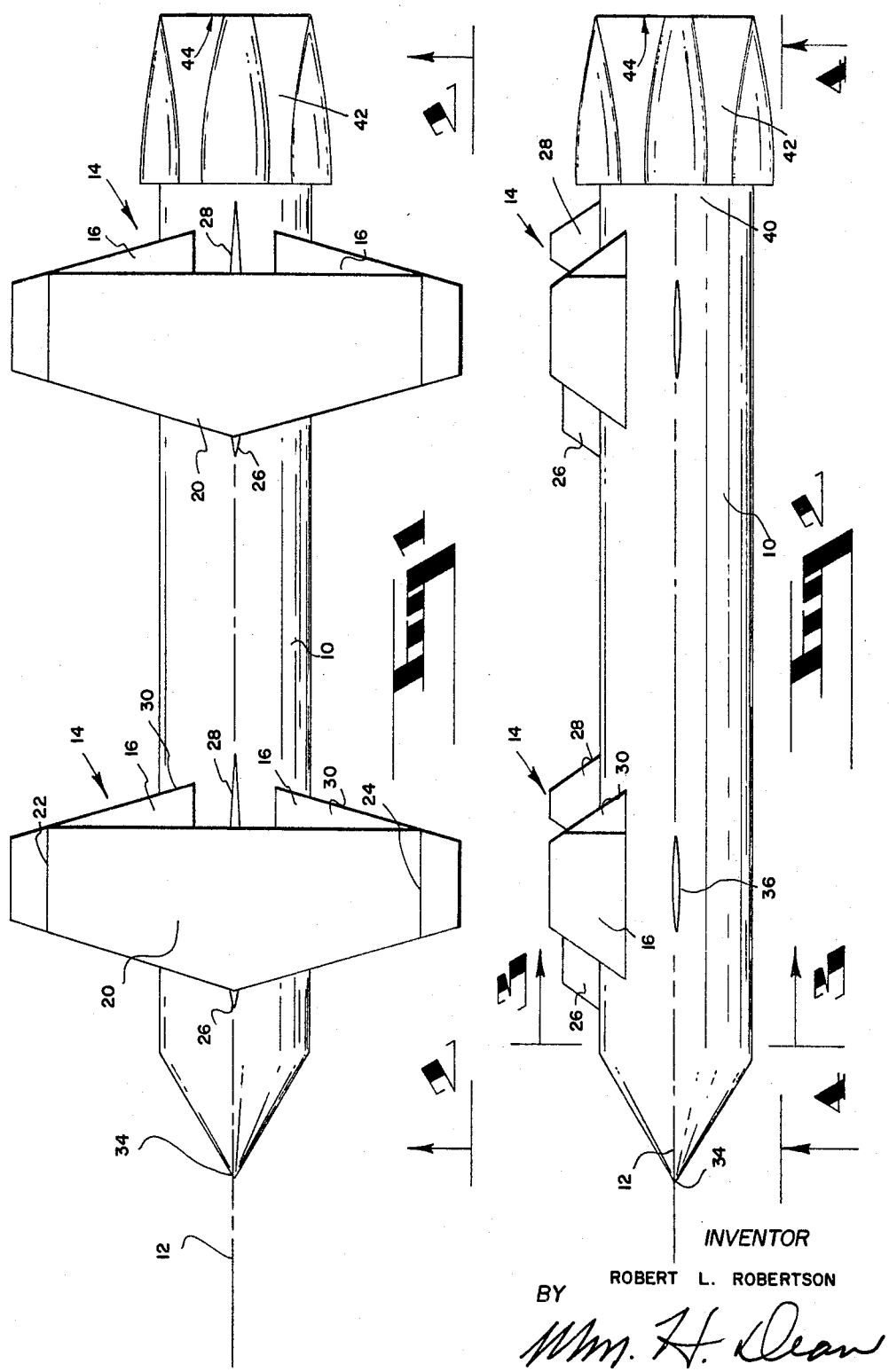
INVENTOR
ROBERT L. ROBERTSON
BY
*Wm. H. Dean*

Nov. 8, 1966    R. L. ROBERTSON    3,284,028
AIRCRAFT
Filed Dec. 7, 1964    2 Sheets-Sheet 2
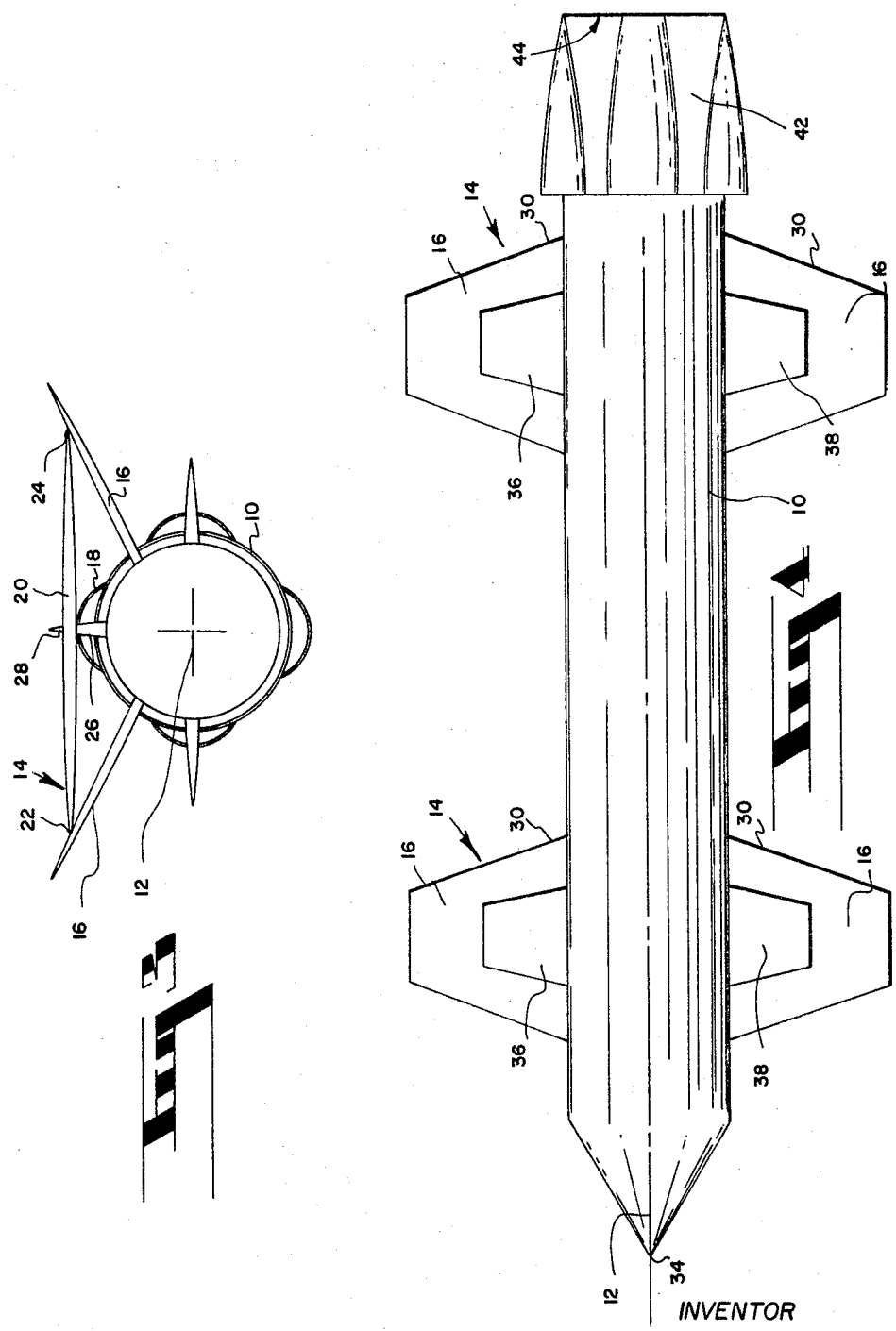
INVENTOR
ROBERT L. ROBERTSON
BY
Wm. H. Dean

United States Patent Office 3,284,028
Patented Nov. 8, 1966

3,284,028
AIRCRAFT
Robert L. Robertson, Phoenix, Ariz.
(6859 E. Gary Road, Scottsdale, Ariz.)
Filed Dec. 7, 1964, Ser. No. 416,203
6 Claims. (Cl. 244—15)

This invention relates to an aircraft, and more particularly, to a supersonic aircraft having novel airfoil structures.

It has been a problem to provide efficient, strong and yet, compact airfoil structures which will provide sufficient area for proper lift at subsonic speeds and yet, which will be very efficient at supersonic speeds. Land aircraft must first fly at subsonic speeds in order to take off and such aircraft must also land at subsonic speeds, consequently, these aircraft, of necessity, require sufficiently large airfoil structures to provide lift at subsonic speeds for take off and comparable airfoil area for landing at subsonic speeds.

It has been a problem to design supersonic aircraft of large load capacity when employing conventional airfoil structures due to the necessity of providing great airfoil surface structures for take off and landing operations and to carry long fuselage structures having sufficient capacity to carry a great number of passengers or to transport a large volume of commodities or freight.

Accordingly, it is an object of the present invention to provide a supersonic aircraft having novel airfoil structures which are compact and interconnected for maximum strength with minimum supersonic aerodynamic resistance.

Another object of the invention is to provide a supersonic aircraft having airfoils which are compact, yet also provide a large area of lift surface for use in take off and/or landing operations at subsonic speeds.

Another object of the present invention is to provide an aircraft having supersonic capabilities, yet which also attains good stability with low take off and landing speeds.

Another object of the invention is to provide a very efficient aircraft having particular advantages in a plurality of identical airfoil assemblies spaced longitudinally of an elongated fuselage, thereby extending the volumetric capacity of the fuselage, as desired, simply by adding identical assemblies of such airfoil structures.

Another object of the invention is to provide a supersonic aircraft having airfoil assemblies affording all of the necessary control functions of an aircraft, such assemblies being spaced longitudinally of the aircraft in proper aerodynamic relationship to each other to thereby render the aircraft aerodynamically efficient and of great carrying capacity.

Another object of the invention is to provide an aircraft having assemblies of airfoil structures which maintain all of the control surfaces in adjacent relation to the fuselage and thereby easy to maintain and to operate efficiently.

Another object of the invention is to provide an aircraft having novel airfoil assemblies which may greatly reduce the cost of manufacture of aircraft as compared to that involved in the manufacture of conventional aircraft airfoil structures.

Another object of the invention is to provide a very versatile aircraft airfoil structure which is capable of being utilized in connection with a great variety of aircraft having supersonic aerodynamic capabilities and having varying lengths of fuselage and load carrying capacities.

Further objects and advantages of the invention may be apparent from the following specification, appended claims and accompanying drawings, in which:

FIG. 1 is a top or plan view of an aircraft in accordance with the present invention, showing a plurality of airfoil assemblies in connection with the fuselage of the aircraft;

FIG. 2 is a side elevational view of the aircraft taken from the line 2—2 of FIG. 1;

FIG. 3 is an end view of the aircraft taken from the line 3—3 of FIG. 2; and

FIG. 4 is a bottom plan view taken from the line 4—4 of FIG. 2.

As shown in the drawings, the aircraft of the present invention is provided with an elongated fuselage 10 having a neutral axis disposed at approximately 12 in the middle of the cross section of the fuselage. This neutral axis 12 extends approximately along the longitudinal axis of the fuselage 10.

The aircraft of the invention is provided with a plurality of airfoil assemblies 14 which are spaced longitudinally along the fuselage 10 and fixed thereto, as will be hereinafter described in detail.

Each airfoil assembly 14 is provided with a pair of upwardly diverging airfoil portions 16 having a connected relationship with the fuselage 10 substantially above the neutral axis 12. Connected to the airfoil portions 16 and spaced above an upper portion 18 of the fuselage 10 is a substantially horizontal airfoil portion 20 having its opposite ends 22 and 24 connected to the upwardly diverging airfoil portions 16 and interconnecting them to afford a very rigid and strong assembly of the upwardly diverging airfoil portions 16 and the horizontal airfoil portion 20.

Disposed between the airfoil portion 20 and the upper portion 18 of the fuselage 10 is a substantially vertical airfoil portion 26. This airfoil portion 26 is provided with a rearward section 28 which may be devoted to control surface operation and this portion 28 extends above the level of the airfoil portion 20, all as shown best in FIG. 2 of the drawings.

Trailing edge portions 30 of the airfoil portions 16 may serve as control structures, as desired, in accordance with various practices known to those skilled in the art.

It will be seen that the fuselage 10 at its forward end 34 is provided with a substantially pointed portion which may, according to known perimeter speed, be designed for operation at supersonic speeds.

Projecting from opposite sides of the fuselage 10 and near a plane of the neutral axis 12 are airfoil structures 36 and 38, these being disposed directly below the diverging airfoil portions 16 of each airfoil assembly 14. These airfoil structures are to serve as control planes.

A rearward portion 40 of the fuselage 10 carries a propulsion means 42 preferably an assembly of turbo jet engines or a combination of turbo jet and ram engines. These engines having gas efflux or jet tube openings at 44 and directed toward the rear of the fuselage. The engine assembly 42 may be composed of a plurality of jet or ram jet engines in accordance with known prior art technology.

It will be apparent to those skilled in the art that the fuselage 10 may be made of any length desired and that a plurality of the airfoil assemblies 14 may be spaced longitudinally of the fuselage 10 in order to provide proper and adequate airfoil surface for both subsonic and supersonic flight.

In accordance with the foregoing specification, the airfoil assemblies 14, including the upwardly diverging airfoil elements 16 and the horizontal element 20, together with the airfoil structures 36 provides a very compact airfoil assembly having substantial surface area and it will be apparent to those skilled in the art that the trailing edge structures of the airfoil portions 16 may be used in the conventional manner for control purposes and, further, that the vertical airfoil structure 28 may also be provided with a pivotal portion to be used in a conventional manner for conrtol surface operation.

The capacity of the fuselage 10 may be limited only by its length and its carrying capacity aerodynamically may be optional with respect to the number of airfoil assemblies 14 used in connection with the fuselage.

It will be obvious to those skilled in the art that various modifications of the present invention may be resorted to in a manner limited only by a just interpretation of the following claims.

I claim:

1. In an aircraft the combination of: an elongated fuselage; a generally pointed forward end of said fuselage; a rearward end of said fuselage; jet propulsion means having efflux passages directed rearwardly from said rearward end; a plurality of airfoil assemblies secured to said fuselage and spaced relative to each other longitudinally along said fuselage; said fuselage having a longitudinal neutral axis disposed at substatnially the middle of the cross section thereof; a pair of first airfoil portions of each airfoil assembly coupled to said fuselage above said neutral axis and diverging upwardly to a level above said fuselage; a second substantially horizontal airfoil portion interconnecting said first airfoil portions at a level above said fuselage and below the extremities of said first airfoil portions.

2. In an aircraft the combination of: an elongated fuselage; a generally pointed forward end of said fuselage; a rearward end of said fuselage; pet propulsion means having efflux passages directed rearwardly from said rearward end; a plurality of airfoil assemblies secured to said fuselage and spaced relative to each other longitudinally along said fuselage; said fuselage having a longitudinal neutral axis disposed at substantially the middle of the cross section thereof; a pair of first airfoil portions of each airfoil assembly coupled to said fuselage above said neutral axis and diverging upwardly to a level above said fuselage; a second substantially horizontal airfoil portion interconnecting said first airfoil portions at a level above said fuselage and below the extremities of said first airfoil portions; a vertical airfoil disposed above said fuselage and below said second airfoil portion and adapted for use as a pivotal control surface.

3. In an aircraft the combination of: an elongated fuselage; a generally pointed forward end of said fuselage; a rearward end of said fuselage; jet propulsion means having efflux passages directed rearwardly from said rearward end; a plurality of airfoil assemblies secured to said fuselage and spaced relative to each other longitudinally along said fuselage; said fuselage having a longitudinal neutral axis disposed at substantially the middle of the cross section thereof; a pair of first airfoil portions of each airfoil assembly coupled to said fuselage above said neutral axis and diverging upwardly to a level above said fuselage; a second substantially horizontal airfoil portion interconnecting said first airfoil portions at a level above said fuselage and below the extremities of said first airfoil portions; a vertical airfoil disposed above said fuselage and below said second airfoil portion; a section of said vertical airfoil extending rearwardly relative to a trailing edge of said second airfoil portion and adapted for use as a pivotal control surface.

4. In an aircraft the combination of: an elongated fuselage; a generally pointed forward end of said fuselage; a rearward end of said fuselage; jet propulsion means having efflux passages directed rearwardly from said rearward end; a plurality of airfoil assemblies secured to said fuselage and spaced relative to each other longitudinally along said fuselage; said fuselage having a longitudinal neutral axis disposed at substantially the middle of the cross section thereof; a pair of first airfoil portions of each airfoil assembly coupled to said fuselage above said neutral axis and diverging upwardly to a level above said fuselage; a second substantially horizontal airfoil portion interconnecting said first airfoil portions at a level above said fuselage and below the extremities of said first airfoil portions; a vertical airfoil disposed above said fuselage and below said second airfoil portion; a section of said vertical airfoil extending rearwardly relative to a trailing edge of said second airfoil portion and adapted for use as a pivotal control surface; said section extending above the plane of said second airfoil.

5. In an aircraft the combination of: an elongated fuselage; a generally pointed forward end of said fuselage; a rearward end of said fuselage; jet propulsion means having efflux passages directed rearwardly from said rearward end; a plurality of airfoil assemblies secured to said fuselage and spaced relative to each other longitudinally along said fuselage; said fuselage having a longitudinal neutral axis disposed at substantially the middle of the cross section thereof; a pair of first airfoil portions of each airfoil assembly coupled to said fuselage above said neutral axis and divering upwardly to a level above said fuselage; a second substantially horizontal airfoil portion interconnecting said first airfoil portions at a level above said fuselage and below the extremities of said first airfoil portions; third airfoil structures projecting substantially horizontally from opposite sides of said fuselage at a level below said first airfoil portions.

6. In an aircraft the combination of: an elongated fuselage; a generally pointed forward end of said fuselage; a rearward end of said fuselage; jet propulsion means having efflux passages directed rearwardly from said rearward end; a plurality of airfoil assemblies secured to said fuselage and spaced relative to each other longitudinally along said fuselage; said fuselage having a longitudinal neutral axis disposed at substantially the middle of the cross section thereof; a pair of first airfoil portions of each airfoil assembly coupled to said fuselage above said neutral axis and diverging upwardly to a level above said fuselage; a second substantially horizontal airfoil portion interconnecting said first airfoil portions at a level above said fuselage and below the extremities of said first airfoil portions; a vertical airfoil disposed above said fuselage and below said second airfoil portion; a section of said vertical airfoil extending rearwardly relative to a trailing edge of said second airfoil portion; said section extending above the plane and said second airfoil; third airfoil structures projecting substantially horizontally from opposite sides of said fuselage at a level below said first airfoil portions.

References Cited by the Examiner

UNITED STATES PATENTS

| 1,104,045 | 7/1914 | Henson | 244—13 |
|---|---|---|---|
| 1,870,119 | 8/1932 | Hughes | 244—35 |
| 3,075,728 | 1/1963 | Kogan | 244—74 |
| 3,078,062 | 2/1963 | Fisher | 244—15 |

MILTON BUCHLER, *Primary Examiner.*

L. C. HALL, A. E. CORRIGAN, *Assistant Examiners.*